United States Patent [19]

Kuhlman

[11] 4,116,119
[45] Sep. 26, 1978

[54] FOOD FORMING APPARATUS

[76] Inventor: Harvey G. Kuhlman, N56 W21466 Silver Spring Dr., Menomonee Falls, Wis. 53051

[21] Appl. No.: 762,382

[22] Filed: Jan. 26, 1977

[51] Int. Cl.² .............................................. A21C 9/06
[52] U.S. Cl. .................................................. 99/450.6
[58] Field of Search ................. 99/450.1, 450.6–450.8; 53/183, 187, 193

[56] References Cited

U.S. PATENT DOCUMENTS

| 3,724,361 | 4/1973 | Schafer | 99/450.6 |
| 3,782,271 | 1/1974 | Tobey et al. | 99/450.6 |
| 3,858,497 | 1/1975 | Ishida | 99/450.6 |
| 3,901,137 | 8/1975 | Jiminez | 99/353 |

*Primary Examiner*—Leonard D. Christian
*Attorney, Agent, or Firm*—Andrus, Sceales, Starke & Sawall

[57] ABSTRACT

A pizza shell forming machine has a bed with a heating unit and an overlying press die unit. Preformed dough balls are supplied to a reciprocating transfer mechanism having confining walls. A pusher moves the dough ball onto the bed when aligned with the die unit. A confining forward wall is movable vertically such that when the ball is located beneath a die unit, the wall is raised for withdrawal. A projecting thin plate is secured forwardly of the wall and moves and discharges it to top surface piercing unit and then into a baking unit. The piercing unit includes a tined wheel overlying a conveyor belt. Hold down rods hold the shell to the belt during piercing. A heating unit is mounted in an opening in the bed. A movable die unit also includes a heating unit to create a baking temperature on the order of 325° F. Die closure is of the order of 1–5,000 psi. Alternatively, a conveyor plate is longitudinally movable through the press for removing a shell. The conveyor plate is mounted for limited vertical movement for movement into engagement with a fixed heating unit. A piercing plate includes a bottom wall with chisel members. A vacuum and air unit picks the formed shell from the conveyor plate piercing the top surface and releasing the shell when the plate is withdrawn.

43 Claims, 15 Drawing Figures

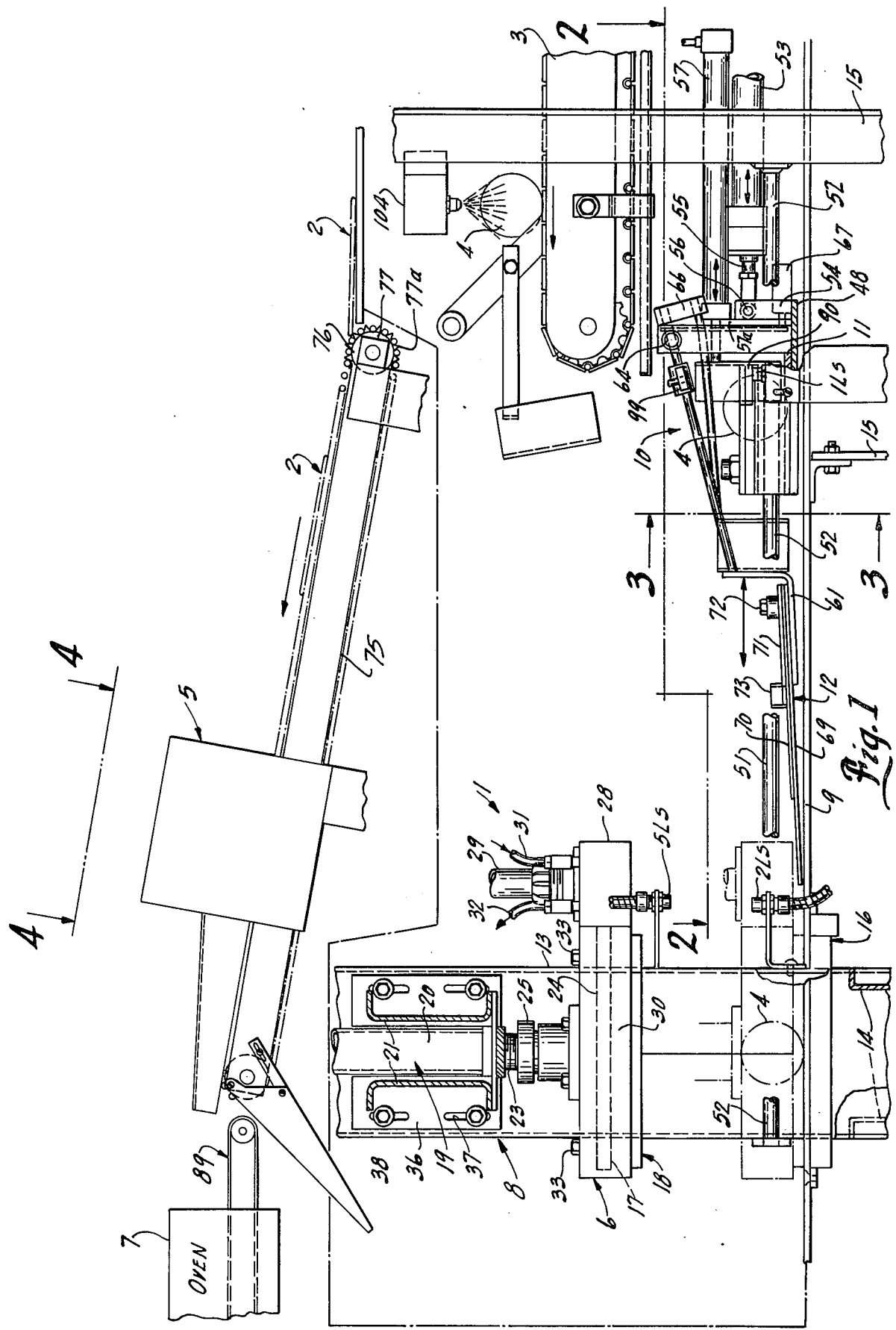

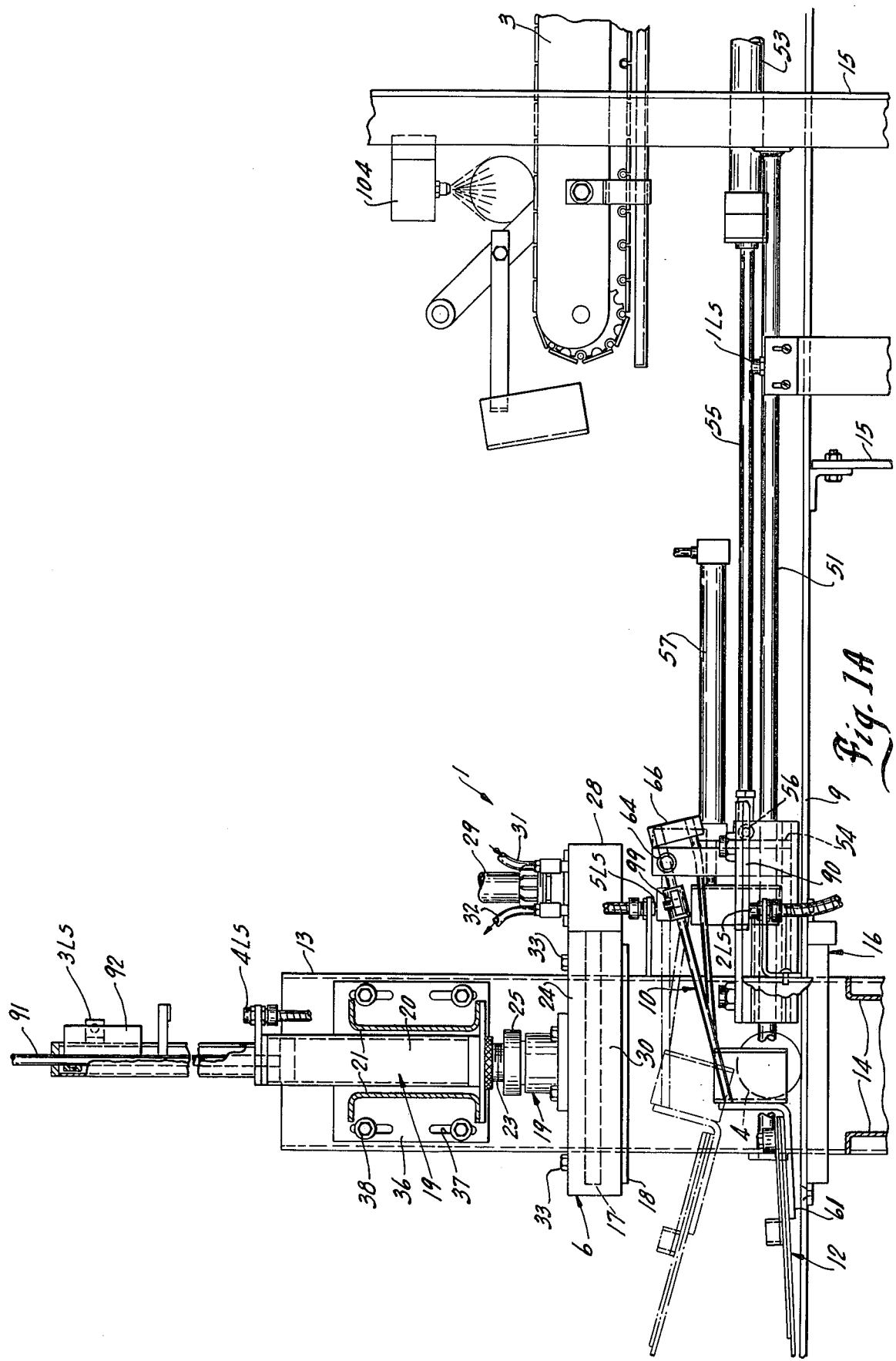

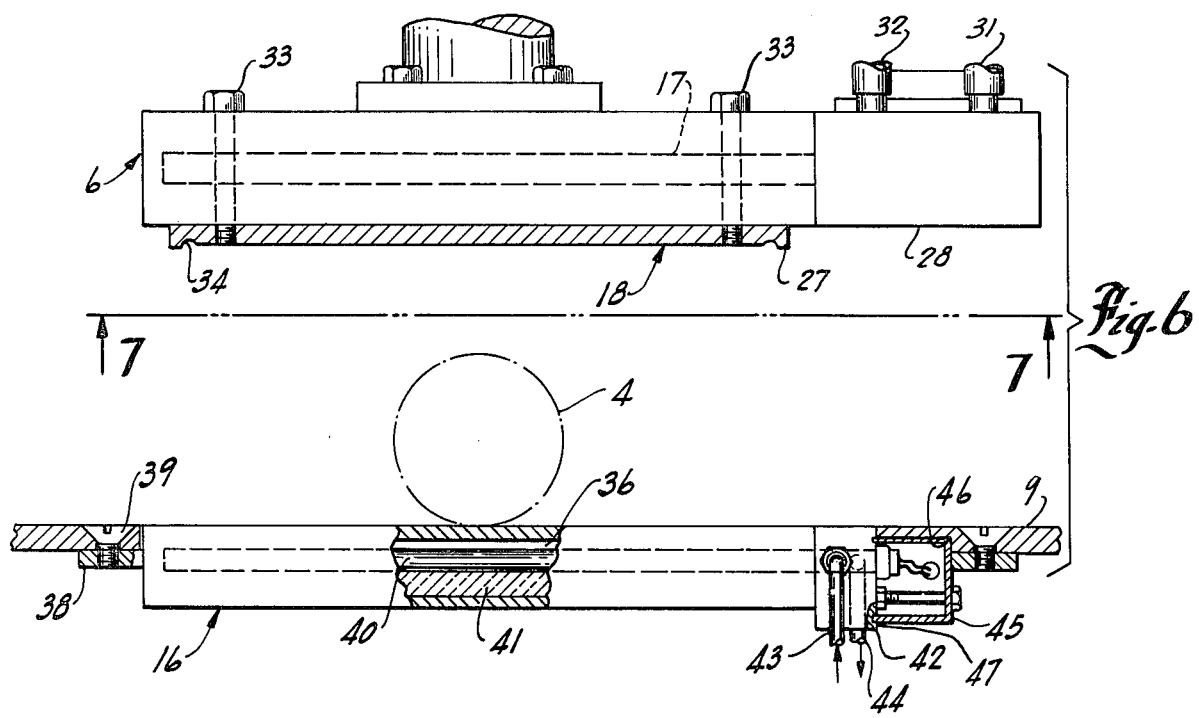
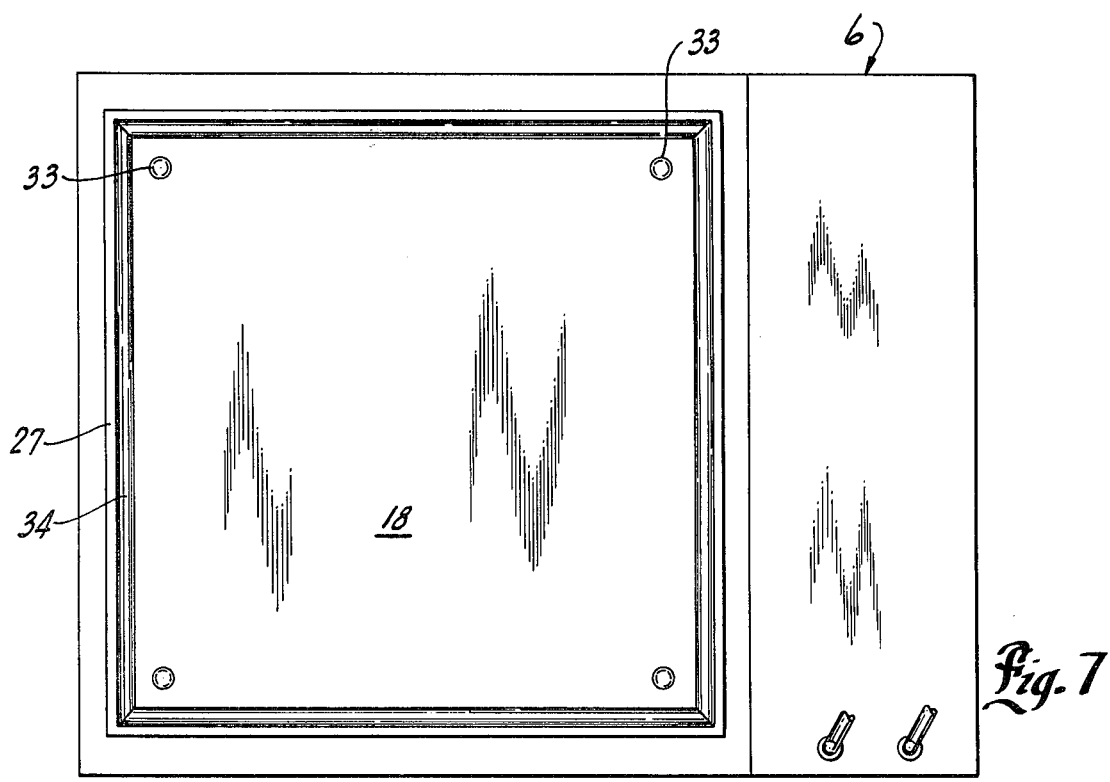

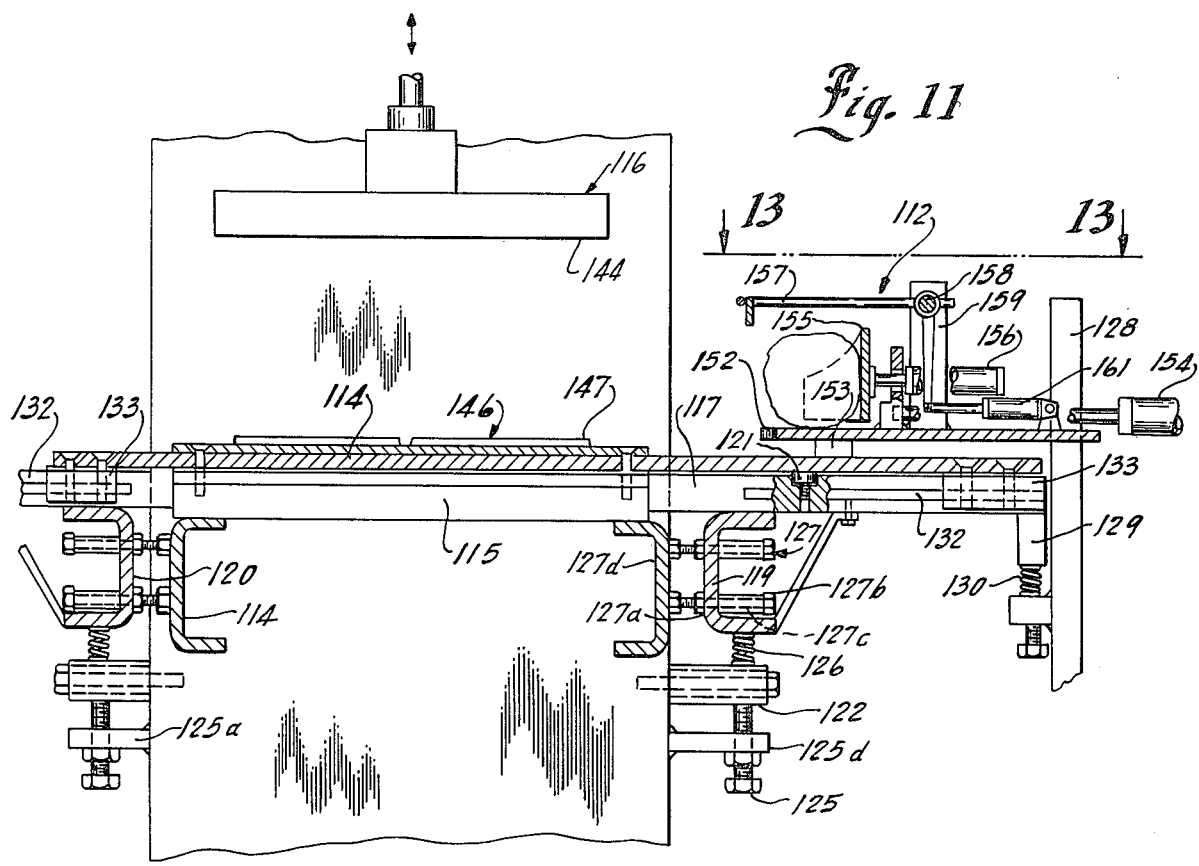
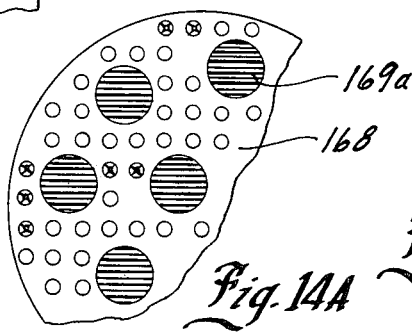
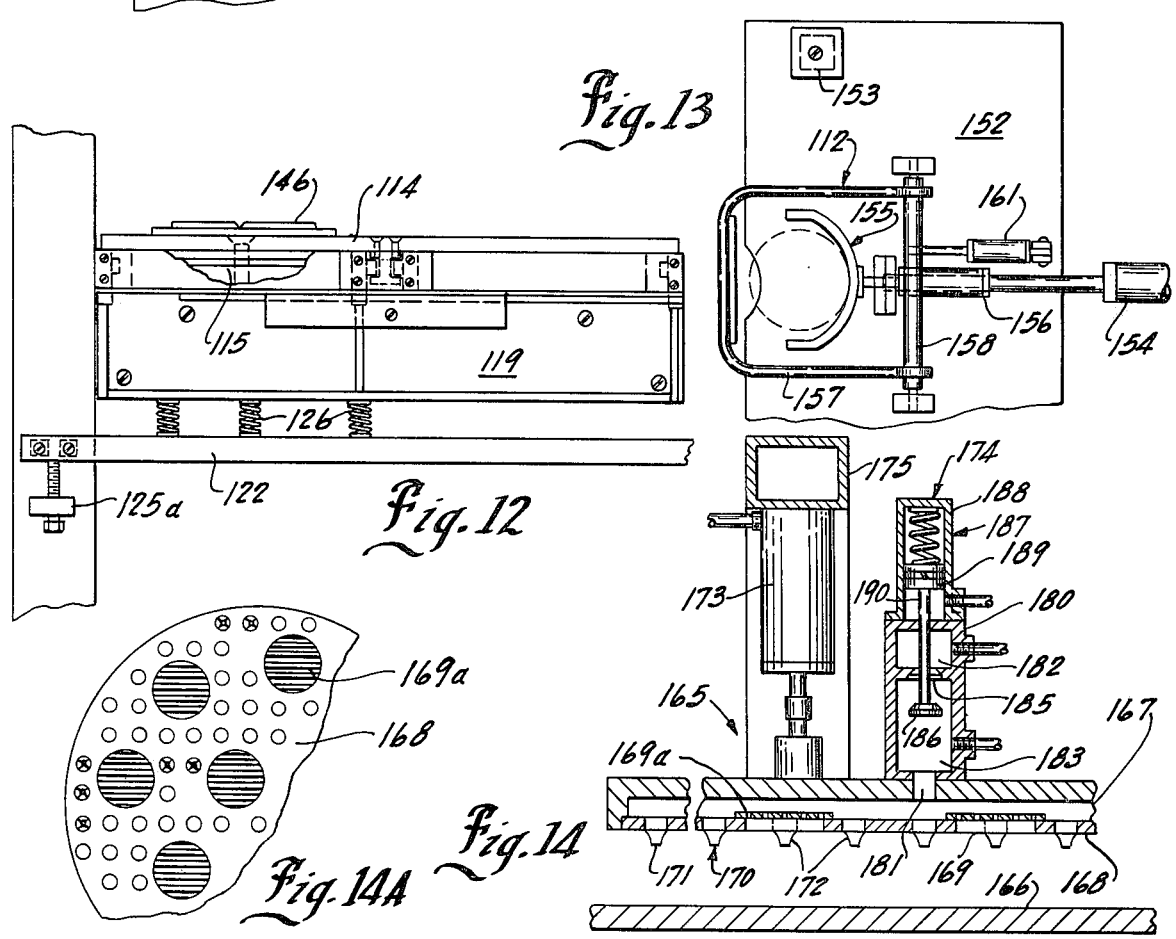

FOOD FORMING APPARATUS

BACKGROUND OF THE INVENTION

This invention relates to a food forming apparatus and particularly to the apparatus for forming of relatively flat, shell members such as pizza shells and the like from a mass of soft dough into a light, flaky crust.

In the mass production of pizzas, pies and the like, the undercrust or shell is preferably automatically formed. An unusually satisfactory crust forming apparatus and method of employing such apparatus is disclosed in applicant's copending application entitled "Apparatus and Method for Forming Shells of Dough" which was filed on Jan. 21, 1974 with Ser. No. 434,164, now U.S. Pat. No. 3,949,660. As disclosed in such application, the crust forming apparatus includes a horizontal supporting bed which incorporates a suitable heating unit. A heated forming die unit is reciprocally mounted above the bed, with a hydraulically driven piston-cylinder unit provided for lowering and raising of the die unit. In forming of pizza shells or the like, a bulk dough ball is pushed along the surface of the bed beneath the die unit which is forced onto the ball at relatively high pressure to form the dough ball into the appropriate shell and to partially bake the shell. The die unit creates a sealed chamber for forming of the dough ball. The die unit is then retracted in two steps, with an initial slight release which maintains the forming chamber for the shell while permitting gases to escape followed by removal to an upward shell release position. A transfer unit then moves between the die unit and the formed shell, and is lowered to the shell. A vacuum is applied to the transfer unit to draw the shell upwardly into abutting engagement with the underface of the transfer unit. The underface is preferably provided with a plurality of pin-like members to further perforate the shell to permit gas release during subsequent final baking.

Although such apparatus provides a highly satisfactory method of forming shells, the requirement to raise the die forming unit sufficient to permit entry of the transfer unit as well as the interrelated time required to introduce the transfer unit, creates a relatively long forming cycle for the forming and transfer of each shell. Servicing and replacement of the forming die unit and the like may also be relatively time consuming in view of the relatively close spacing between the die forming unit and the bed which is preferably employed in order to minimize the time required to lower the unit into the forming position.

The apertured pick-up or transfer unit which moves downwardly into an engagement with the partially baked dough will have the tendency to accumulate dough material in some of the openings, requiring periodic cleaning. The underside of the transfer unit must therefore be conveniently available for cleaning. Further, the lateral, aligned arrangement of a plurality of forming units as disclosed in the above application, is desirable to increase production but is limited by the size of the oven unit which can be employed in an in-line food processing system.

SUMMARY OF THE PRESENT INVENTION

The present invention is particularly directed to an improved high speed forming apparatus with a unique transfer system for moving of the formed product on a supporting conveyor means which is releasably coupled to the forming components such as the heated die unit and a conveyor heat source such as in a pizza forming apparatus or the like. The apparatus of the present invention may also be constructed for convenient servicing and cleaning of the transfer and forming components so as to particularly adapt the unit to processing of food products and the like.

In accordance with a particularly significant feature of this invention, the dough for forming the shells are preformed into appropriate masses such as balls of dough. A transfer mechanism is reciprocally mounted to one side of the die unit and is movable beneath the die unit. The transfer mechanism includes a confining encircling means defining a dough ball receiving support means. The forward wall means of the encircling means is movable vertically such that when the ball is located beneath the die unit, the encircling means can be withdrawn by raising of the wall means. The front wall means further includes means such as a forwardly projecting thin plate means for moving beneath a formed shell and transferring thereof from beneath the die unit simultaneously with the proper positioning of the dough ball beneath the die unit.

In accordance with a further feature of this invention, the formed shell is discharged to a transfer assembly having means for firmly supporting the shell as it passes through a rotating timed unit for piercing the shell and then transfering thereof into a baking unit. This releases gases within the shell for improved baking.

The dough balls may be preformed and fed to the transfer conveyor operated in synchronism with the transfer mechanism for proper and automated feeding, forming and transfer of the dough and formed shells.

In a further feature of the invention, the support bed is formed with an integrated heating unit forming the support for the dough ball beneath the heated die unit. The heating unit of the bed and the die unit are water cooled and selected to create a baking temperature on the order of 325° F. Preferably the die closure pressure is selected to be of the order of 1–5,000 psi (pounds per square inch).

In accordance with a different embodiment, a supporting bed may form a conveyor means which is longitudinally movable between the movable die means and a formed shell removing means. A fixed heating unit is then mounted beneath the bed and the movable conveyor means is mounted for limited vertical movement relative to the supporting means such that die closure movement results in a supporting bed housing into heat transfer engagement with the heating unit but is otherwise released. This not only minimizes the weight of components being moved but eliminates the interference between the conveyor means and the heating unit and the like.

In accordance with a preferred construction, a removable means includes an overlying pneumatic plate unit, similar to that disclosed in the above identified application, which is lowered into overlying, abutting engagement with an aligned shell. The plate unit includes an apertured plate alternately connected to a vacuum and to an air source by a pilot operated switching valve to pick up the formed shell from the conveyor plate, which is then withdrawn and the shell is released, onto an oven conveyor unit or the like for subsequent baking or processing.

In accordance with another feature of the present invention, changing of dies as well as cleaning and other maintenance of the die unit may be facilitated by adjustably mounting of a die power cylinder unit within a supporting framework. The adjustable mounting may be released and the power cylinder actuated to first extend the die unit downwardly to engagement with the bed means or the like, after which the cylinder and ajustable supporting framework unit move upwardly and locked in place. Retraction of the die unit provides additional spacing for convenient working thereon.

For high speed mass production, separate forming units can be arranged in staggered rows with a common conveyor means. As the total mass of the conveyor means is minimal, the desired high speed rapid movement of the conveyor means may be readily accomplished.

The present invention provides forming apparatus having a high speed supporting conveyor means for use with an underlying heating element or the like and particularly such improved high pressure forming apparatus for forming of pizza shells or other crust-like food products. The present invention is particularly adapted to food forming processing apparatus, where government regulations require high standards of cleanliness, as a result of the convenient maintenance and servicing construction.

BRIEF DESCRIPTION OF DRAWINGS

The drawings furnished herewith illustrate a preferred construction of the present invention in which the above advantages and features are clearly disclosed as well as others which will be readily understood from the following description of such embodiment.

In the drawings:

FIGS. 1 and 1A are fragmentary side elevational views of a pizza shell forming apparatus constructed in accordance with the present invention;

FIG. 6 is an enlarged fragmentary view illustrating the die and heating unit in partial section;

FIG. 7 is a bottom view of the movable die taken generally on line 7—7 of FIG. 6;

FIG. 11 is an enlarged longitudinal vertical section of the apparatus taken generally on line 11—11 of FIG. 10;

FIG. 12 is a transverse vertical section taken generally along line 12—12 of FIG. 9;

FIG. 13 is a fragmentary enlarged view taken generally on line 13—13 of FIG. 11;

FIG. 14 is a fragmentary enlarged view taken generally on line 14—14 of FIG. 10 and partially in section to show a formed shell pickup unit;

FIG. 14a is a fragmentary bottom view of the shell pickup unit; and

DESCRIPTION OF ILLUSTRATED EMBODIMENTS

Figure 2:
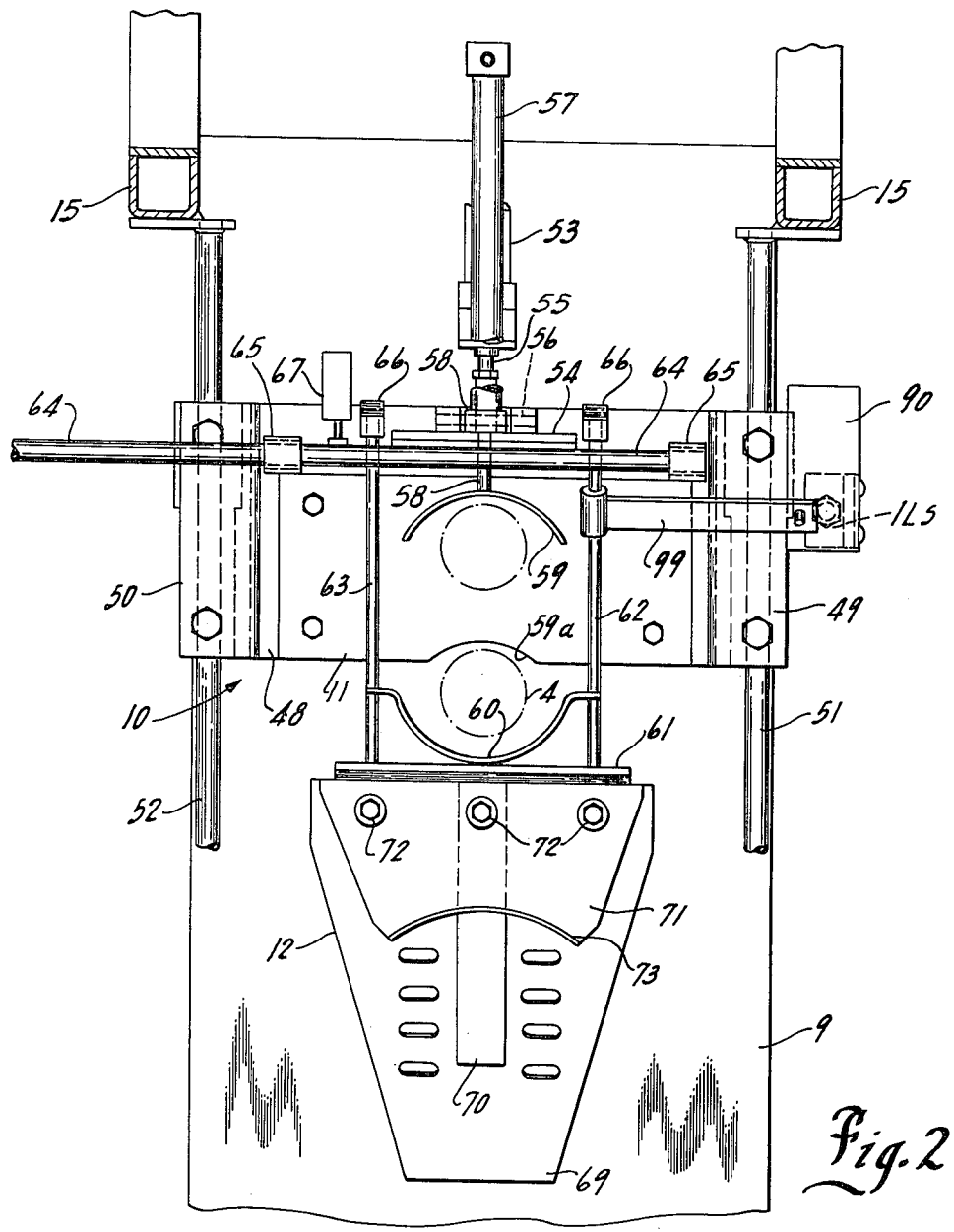
FIG. 2 is plan view of the transfer mechanism shown in FIG. 1 taken generally on line 2—2 of FIG. 1.

Referring to the drawings and particularly to FIG. 1, the present invention is shown in connection with a pizza shell forming apparatus 1 which is adapted to form partially baked pizza shells 2. Generally, an in-line feed conveyor means 3 supplies, in sequential, stepped relation, dough masses shown in the form of dough balls 4 to the apparatus 1. Each ball 4 is of a sufficient mass to form a single pizza shell 2. The formed and partially baked shells 2 pass from the apparatus 1 through a piercing unit 5 and then to an in-line oven 7 for final baking.

Generally, the illustrated forming apparatus 1 is shown including a die unit 6 secured to power piston unit 8 for movement into and from engagement with a common support or bed plate 9. Plate 9 extends rearwardly from the die unit 6 and beneath dough ball transfer unit 10 which is aligned with the discharge end of feed conveyor means 3. The dough balls 4 are placed on a carrier plate 11 of unit 10 which moves forwardly to properly locate the dough balls 4 with respect to the respective forming die unit 6. A transfer plate unit 12 is secured to the forward end of unit 10 and transfers formed shell 2 to the piercing apparatus simultaneously with the placing of a dough ball beneath die unit 6.

More particularly, in the illustrated embodiment of the invention, a main supporting means framework includes a pair of laterally spaced vertical channels 13 located to the opposite sides of apparatus. A suitable cross-brace or frame in the form of a pair of opposed U-shaped channels 14 are secured to the vertical channels 13 beneath the bed plate 9 to firmly support the plate 9 at the die unit 6. The bed plate 9 is further firmly supported at the opposite ends by suitable frame structures 15.

A heating unit 16 is secured as a part of plate 9. The heating unit 16 is a generally rectangular member having planar top and bottom walls and is secured to the plate 9 with the top wall in planar alignment with plate 9. The upper die unit 6 includes a heating unit 17 with a flat bottom wall to which a suitable forming die 18 is secured.

With the dough balls 4 properly located within the die unit 6, the shell 2 is formed by lowering the die unit 6, which includes a hydraulic cylinder drive unit 19.

Referring particularly to FIG. 1, the hydraulic drive unit 19 includes a cylinder member 20 secured between a pair of U-shaped cross-braces 21 by suitable mounting brackets 22. A piston-rod assembly 23 projects downwardly from cylinder 20 and is connected to the back side of a heated die plate 24 by an adjustable connection 25 generally as in the previously identified co-pending application. Plate 24 includes a suitable internal heater 17. The underside of the plate 24 is a rigid, flat, planar surface to which the replaceable forming die 18 is releasably secured.

Die 18, as most clearly shown in FIG. 6, is formed with a peripheral vertical lip 27 to define a forming cavity corresponding to a finally formed pizza shell 2 of a predetermined size and thickness. The shell 2 may be formed as a round or rectangular shell by use of an appropriately shaped die 18. In FIG. 7, the die 18 is shown shaped to form a rectangular shell 2. The type and size may vary, and consequently, the die 18 is preferably made replaceable.

The upper heated die unit 6 includes a connection box 28 connecting a power supply line 29 to a plurality of heating elements 30. The unit 6 transmits heat backwardly through the several connections to drive unit. To prevent damage to the heating unit, the connections including seals, packing and the like. The electrical connections box 28 is provided with a water cooling passage and connected to suitable cooling water lines 31 and 32 for circulating water through the unit from a suitable source, not shown, such as the usual pressurized water system or the like.

The illustrated forming die 18 is a flat, plate-like member having suitable bolt openings for bolted attachment of the die to the moving plate, as at 33. The die 18 includes the peripheral vertical wall or lip 27 defining the sidewall of a forming cavity. The outer edge of the lip 27 is flat and in a common plane. The bed plate is formed with a flat surface such that when the die moves downwardly, the flat lip 27 engages the plate and forms an appropriate forming chamber. The sidewall or lip 27 may be provided with four equicircumferentially spaced cutouts or grooved portions. Applicant has found that this provides a very simple and reliable means of permitting escape of the gases formed during the baking process while permitting the rapid opening of the die units and removal of the formed pizza shell. Each of the cutouts may be a simple rectangular notch formed in the lip 27 to the adjacent base portion of the pizza cavity.

The base of the die cavity may include an inner planar portion with an outer encircling recess 34. This has been found to result in a very reliable distribution of the dough within the shell.

The lower heating unit 16 generally includes an outer box-like housing 36 having a planar upper wall. Plate 9 has an opening 37 for receiving the housing 36. An attachment flange 38 is secured to three sides of housing 36 spaced downwardly from the planar upper wall such that the flanges abut the underside of the plate 9 with the upper wall in the plane of plate 9. Suitable flat-head screws 39 are shown connecting the flange 38 to the plate to properly locate the unit 16. A plurality of heating units or elements 40 are secured within the box-like housing and insulation 41 located to the bottom side thereof.

The heating elements 40 are shown as rod-like elements. The one end of the elements 40 are suitably supported within a water cooled end box 42 secured to the one end of housing 36. Suitable water cooling lines 43 and 44 secured to the opposite ends of the box 42 to circulate water therethrough and cool power connections 45 made within an outer cover 46. The edge of the cover 46 mates with a gasketed groove 47 in the end wall of the cooling box 42 to protect the connection from the environment.

Figure 3:
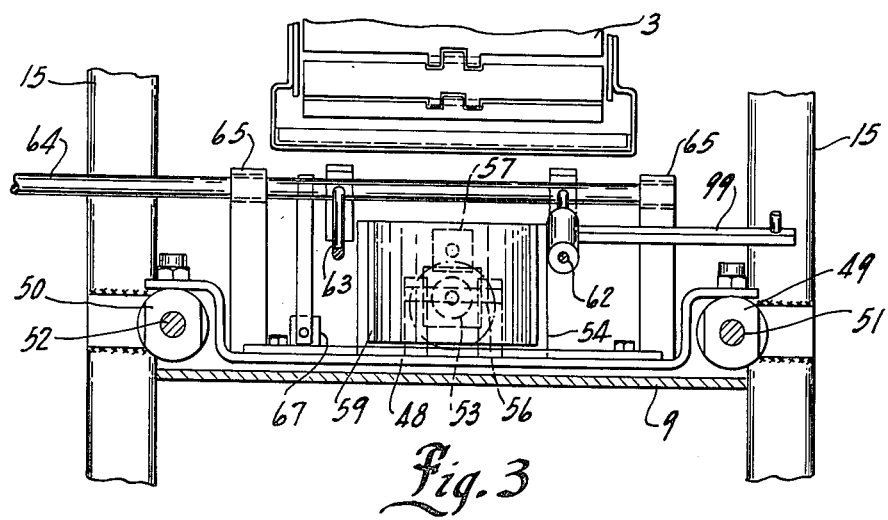
FIG. 3 is a transverse vertical section taken generally along line 3—3 of FIG. 1.

The dough ball 4 is positively and accurately positioned within the die unit 6 through the positioning mechansim or unit 10 which is uniquely constructed to positively locate the ball 4, as shown in FIG. 1. Referring to FIGS. 1 - 3, the transfer unit 10 includes a base plate 48 which spans the bed plate 9 and is secured at the opposite ends to similar sliding bushing 49 and 50, having suitable lubricating connection 51. Bushing 49 and 50 are similarly slidably mounted on support rods 51 and 52 which are affixed at the opposite ends to the vertical support channels 13 and to a forward vertical support structure 15. Rods 51 and 52 are positioned to locate the base plate 48 slightly above plate 9. The dough ball plate 11 is bolted or otherwise secured to the base plate 48 for movement with plate 48. The plate 48 extends rearwardly from plate 11 and is secured to a piston-cylinder unit 53 secured to the structure 15. As shown, a coupling bracket 54 is secured to the back edge of plate 48. The piston rod 55 is secured to the bracket 54 as by a bolted pivotal connection 56. Air or other suitable fluid supplied to the unit 53 provides for reciprocating of plate 48 and therefore plate 11 between the retracted position of FIG. 1 and an extended position of FIG. 1a.

In the extended position, the forward edge of carrier plate 11 is located essentially in the location to locate the dough ball 4 beneath the die unit 6.

The dough ball 4 is pushed from plate 11, as follows. A power cylinder unit 57 is secured as at 57a to the backside of bracket 54 and moves therewith. The piston rod 58 projects forwardly and is secured to a vertical wall 59 which is located immediately beneath the discharge end of conveyor 3. Wall 59 is slightly curved to define a confining support for the dough ball 4. When the carrier plate 11 is extended, the cylinder unit 57 is actuated to push the ball 4 from plate 11 onto plate 9 in precise alignment with the die unit 6. The outer edge of plate 11 is also preferably provided with a curved notch as at 59a to assist in locating of the dough ball 4, as shown in FIG. 2.

The dough ball 4 is further confined by a forward wall 60 of the transfer plate unit 12 which simultaneously transfers a formed shell 2.

The plate unit 12 includes a generally L-shaped mounting bracket 61 having an upstanding vertical wall. A paid pivot arms or rods 62 and 63 are fixed to the vertical wall and extend outwardly to the opposite side of wall 59 to and through a pivot support shaft 64. The shaft 64 is supported in vertical posts 65 aecured to the base plate 48. The outer free ends of rods 62 and 63 are provided with counterweight units 66. The shaft 64 is secured to an air actuated cylinder unit 67 secured to and moving with base plate 48. Unit 67 is actuated to pivot shaft 64 and thereby raise the transfer plate unit 12 during retraction of the transfer unit 10.

The ball confining wall 60 of unit 12 is a curved wall secured to the backside of L-shaped bracket 61 and the pivot rods 62 and 63 and thus moves with the assembly. When the unit 12 is pivoted to a ball release position, wall 60 moves above the top of ball 4 for retraction, leaving ball 4 aligned with die unit 6, as shown in FIG. 1a.

The shell transfer plate unit 12 further includes a plate member 69 secured to the bottom leg or wall of bracket 61 and extended forwardly which is slightly inclined to locate the lower edge of plate member 69 in sliding engagement with plate 9. Plate member 69 may be provided with tapered sides and apertured to reduce the weight. A thin leaf spring 70 is secured to the top of plate member 69, as shown in FIGS. 1 and 2, and urges the outer end into sliding engagement with plate 9 and thus beneath the formed shell 2. A stop wall member 71 is secured overlying the spring 70 and plate member 69, with the assembly interconnected by suitable bolt means 72. The wall member 71 projects outwardly over the assembly with a short vertical wall 73. As the assembly moves forwardly, the shell 2 moves up on the member 69 and into engagement with wall 73 for positive transfer of the shell 2. A flat wall 73 would be used for the square shell forming die unit 6.

The shell 2 is positively moved and pushed from beneath the die unit 6 with the shell extending forwardly of the transfer plate unit 12. The free outer end portion of the shell 2 moves from the plate 9 onto the piercing unit 5.

Figure 4:
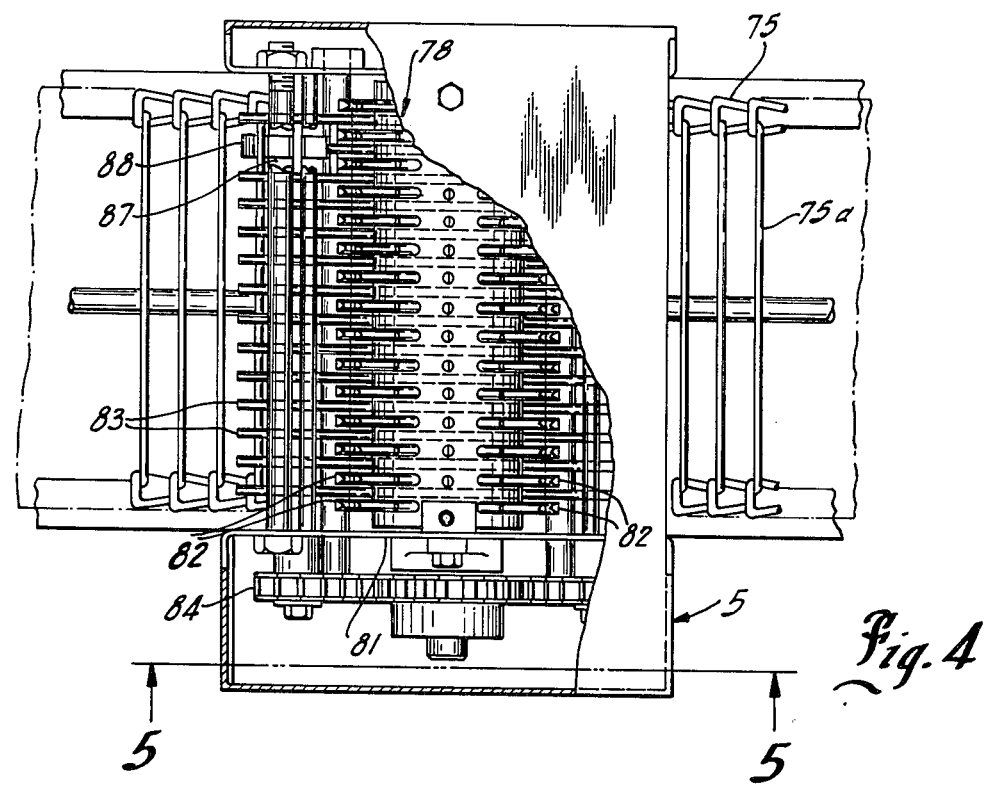
FIG. 4 is a fragmentary plan view taken generally on line 4—4 of FIG. 1.

Unit 5 (FIG. 4) includes a wire belt 75 including laterally extended wire supports 75a and having the one end rotatably mounted immediately adjacent to the end of plate 9 on a suitably rotating support roller 76. A picking wheel 77 may be secured to roller 76 and includes a plurality of sharp tines or projections 77a which are spaced to project upwardly between the wires of wire belt 76. The picking wheel 77 engages the shell 2 and positively propels the shell 2 onto the wire belt 75 which carries the shells 2 upwardly to the piercing unit 5.

Figure 5:
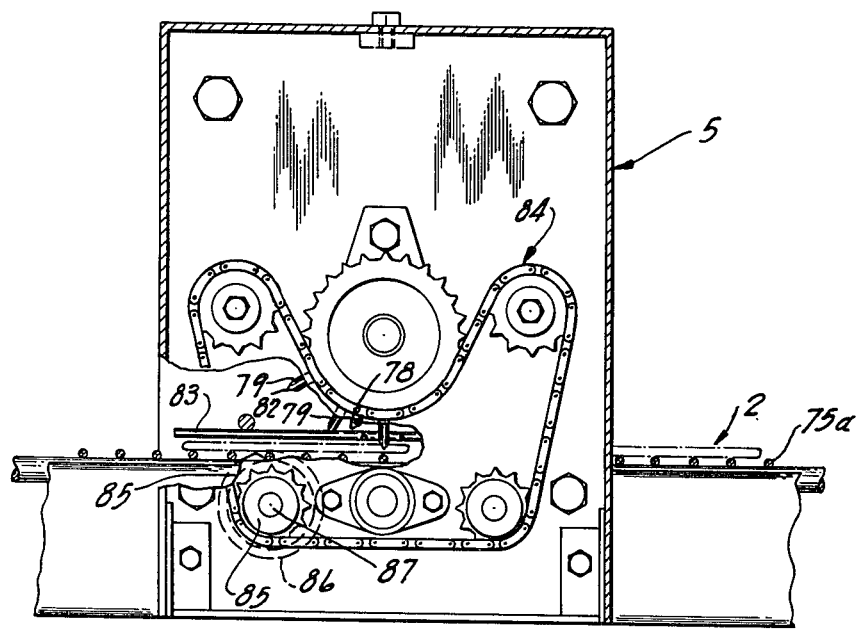
FIG. 5 is a transverse section taken generally on line 5—5 of FIG. 4.

Unit 5 (FIGS. 4 and 5) includes a rotating multiple tined wheel 78 rotatably mounted above the belt 75. Rows of circumferentially spaced tines 79 are secured to a support shaft to which is rotatably supported in a suitable support frame structure 81. Each tine 79 is a similar thin, rod-like member having a chisel-end terminating in a flat face 82, which moves into close spaced relation to belt 75 for piercing the upper surface of shell 2.

A plurality of longitudinal guide rods 83 are secured extending longitudinally of belt 75 just above belt 75 within piercing unit 5. The rods 83 are located between the rows of tines 79 and support the shell 2 as it moves through the piercing unit 5 and prvent the tines from picking the shell up.

The tines wheel 78 is coupled to chain drive mechanism 84 secured to the one frame member and includes a driven sprocket 85. A drive motor 86 is secured to the sprocket shaft 87 which is journaled within the supporting frame work between the upper and lower runs of belt 75. Drive sprockets 88 are secured to the shaft 87 and mesh with the lateral belt wires 75a to rotate the belt and interconnected members.

The formed shells are transported from the piercing unit 5 and discharged to an oven conveyor 89 for movement through the oven 6, which may be of any suitable construction.

Figure 8:
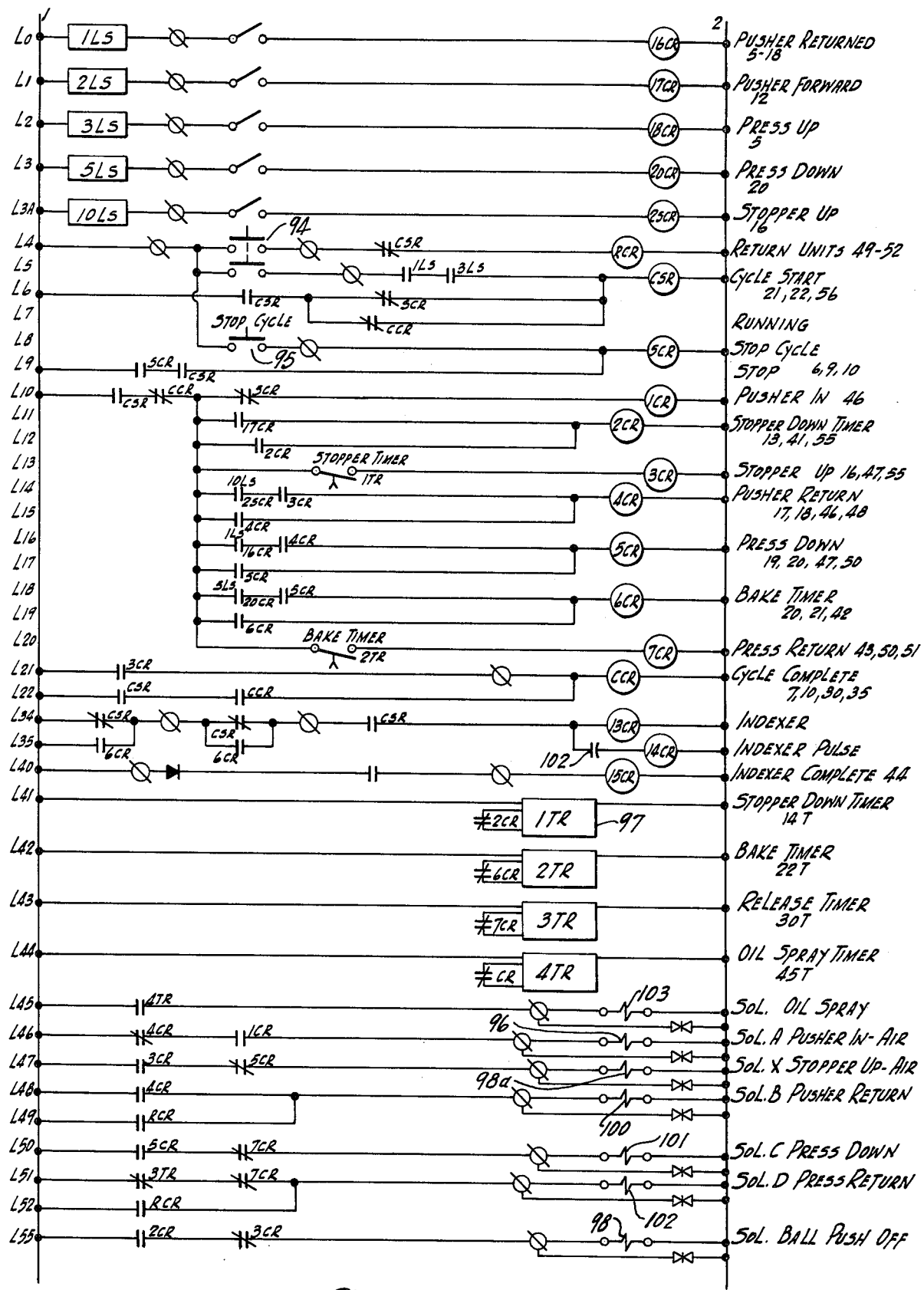
FIG. 8 is a schematic circuit diagram for the unit of FIG. 1-6.

The machine operation may be suitably automated to sequentially and repetitively actuage the transfer mechanism and the press in any suitable manner and one control circuit is shown in FIG. 8 with the components shown and identified by conventional identification combined with number and letter symbols in an across the line diagram, with each line identified by a separate member.

The machine operation is controlled from five limit switches identified by the numbers 1LS through 5LS which are connected to actuate suitable relays. The limit switches are mounted on the machine, as shown and hereinafter described and may be suitable magnetically actuated switches. A shaping and coupling circuit may be provided between the limit switches and relay. As such practical detail will be readily apparent to those skilled in the art, it has not been shown for purposes of simplification and clarification of the drawing. FIG. 8 is an across-the-line illustration with the horizontal circuit lines numbered L1 – L55 for reference purposes and the relays identified by conventional terminology and symbols. Further, the limit switch relay contacts in FIG. 8 are also identified by the limit switch member for convenience and ready understanding of the drawing.

Referring to FIG. 2, a pusher return limit switch 1LS is mounted adjacent to the support structure at the transfer mechanism 10. The swtich 1LS is closed by a magnetic plate actuator 90 carried by the transfer mechanism 10, when the transfer mechanism is fully returned. A second limit switch 2LS (FIGS. 1 and 1a) is located immediately on the press support 13 and is actuated by the movement of the plate 90 with the transfer mechanism 10 in the full forward position. A press-up limit switch 3LS and a press-down limit switch 4LS are mounted on the upper portion of the cylinder unit 19 and coupled to a suitable magnetic actuating mechanism 91 and 92 for operating and closing of the limit switches 3LS and 4LS with the press in the respective positions. The up-limit switch 3LS actuator is shown as the elongated plate 92 which actuates and closes the limit switch 3LS as the press start to rise or retract thereby initiating a new cycle as hereinafter developed. The final limit switch 5LS is mounted on the press frame 13 and is actuated by the upward movement of the stopper wall 73 just prior to retraction of the transfer mechanism 10.

Referring to FIG. 8, lines 4 and 5, a two-pole cycle start switch 94 is provided. The first contacts in line 4 are in series with an automatic return unit relay RCR having contacts in line L52 which in turn completes the circuit to a solenoid press return solenoid in the event the press unit is down at the initial start of the cycle. The second set of contacts of switch 94 are in line L5 in a series with a first and third limit switch L1S and L3S and the cycle start relay CSR which contact opens contacts CSR in line L4 and closes a set of normally open interlock contacts CSR in line L6 around cycle switch circuit. CSR relay also has a set of normally closed contacts connected in line L8 in series with a stop cycle relay SCR, and a stop cycle switch 95 which is operable to terminate and prevent completion of the cycle when actuated. Relay contacts CSR are also connected in lines L9 and L10 to interlock with the cycle start relay CSR. When the CSR relay is energized, contacts CSR in line L10 complete the circuit to a push-in relay 1CR which when energized closes a set of contacts 1CR in line L46. This energizes a transfer solenoid 96, thereby actuating the air cylinder to move the transfer mechanism 10 inwardly. This results in the movement of the dough ball 4 into the die unit 6 at the innermost position, the second limit switch 2LS is connected in line L12 and actuates a set of interlock contacts 2CR and a set of normally open contacts 2CR in the circuit line L41 energizing a stopper down timer 97 and a set of contacts 2CR in line 55 actuating a solenoid push-off solenoid 98 which actuates transfer mechanism air cylinder 57 to move the dough ball 4 into position between the press unit. The timer 1TR times out and closes a set of contacts 1TR after a momentary period. Contacts 1TR are connected in line L14 and energize a relay 3CR which has contacts in L16, 47, 55. Relay 3CR actuates the contacts for an air solenoid 98a for unit 67 to raise stopper wall 73. A limit switch actuator 99 secured to rod 62 actuates limit switch 5LS in line L16. In line L16, a pusher return relay 4CR is connected in a series with the limit switch 1LS. The relay 4CR closes a set of interlock contacts 4CR in line 17 to hold itself energized. It also closes contacts 4CR in line 46, opening such circuit and simultaneously closing the set of contacts 4CR in line L48 to energize the pusher return solenoid 100 in line L48 which actuates the air cylinder to return the transfer mechanism 10. Relay 4CR also closes a set of contacts in line L18 which is connected with the first limit switch 1LS to energize the press down relay 5CR which operates a press down solenoid 101 to actuate cylinder unit 19 to lower die unit 6.

The relay 5CR includes a set of normally open contacts SCR in line L20 in series with the press down limit switch 4LS and a bake timer relay 6CR. The relay 6CR closes interlock contacts 6CR in line L21 and a set of timer control contacts 6CR in line L42 which actuates a bake timer 2TR. The bake timer 2TR operates for a predetermined period of time affecting energization of the heating units 16 and 17 to rapidly raise the temperature to the desired baking temperature. After a predetermined period of time, the timer 2TR closes a set of contacts 2TR connected in line L22 in series with a press return relay 7CR, which closes contacts 7CR in line L43 for controlling a release timer 3TR, which has contacts 3TR in line L50 to momentarily remove the hydraulic pressure from the press and release the die unit 6 to release the gases generated during the high temperature baking. Relay 7CR closes a set of contacts 7CR in line 51 for returning or raising of the press. The unit is first actuating a solenoid 102 for pulsed by the release timer 3TR to release the gas and then actuated to complete withdrawal or raising of the press die unit 6.

The transfer cycle is completed when the stopper relay 3CR is energized indicating that the transfer unit 10 has returned. This provides for energization of a cycle complete relay CCR in line L34. This relay is operative to open the circuit from line L10 and contacts CCR in an interlock circuit in line L7. The press is ready for a new cycle whenever the press is again moved upwardly to close the limit switch 3LS in line L5.

The dough ball 4 is fed to unit 10 by intermittent indexing of conveyor 3. In the illustrated circuit, a relay 13CR is connected in line with L36 in series with the set of contacts CSR of the cycle start relay CSR of line L5. A pulse relay 14CR is connected parallel with relay 13CR in series with a capacitor 102. The relay 14CR is connected to actuate and provide timed power for operating of the conveyor 3 and transferring of the dough ball 4 onto the transfer plate 11.

Each dough ball 4 is preferably provided with an oil coating just prior to feed onto plate 11. A timer 4TR is shown connected in line L44. Contacts 14CR of relay 14CR in line L37 are connected and actuate the timer 4TR simultaneously with the indexing of conveyor 3. Contacts 4TR in line L45 energizes an oil spray solenoid 103 which actuates spray unit 104 (FIG. 1) to apply an oil mist onto the dough ball 4 as it moves beneath a spray nozzle.

Figure 9:
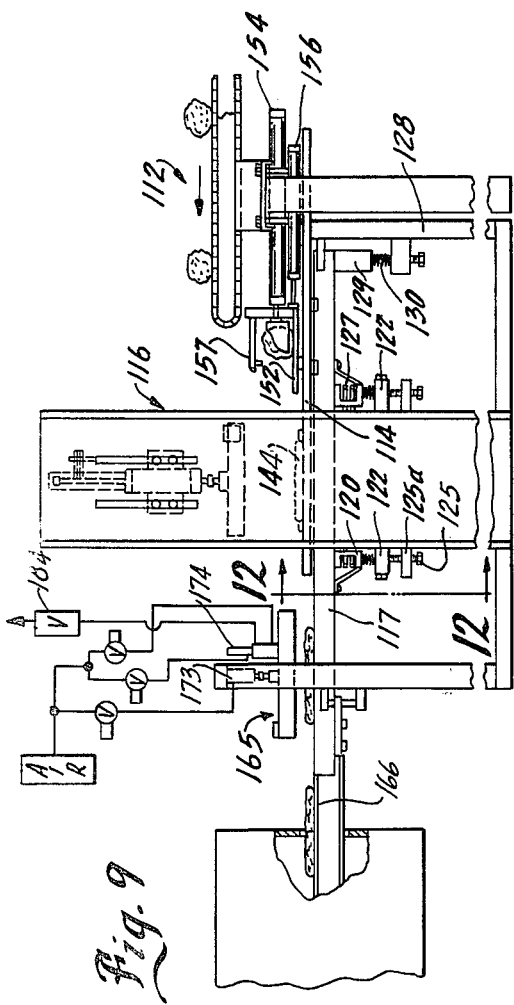
FIG. 9 shows an alternate embodiment of the invention.
Figure 10:
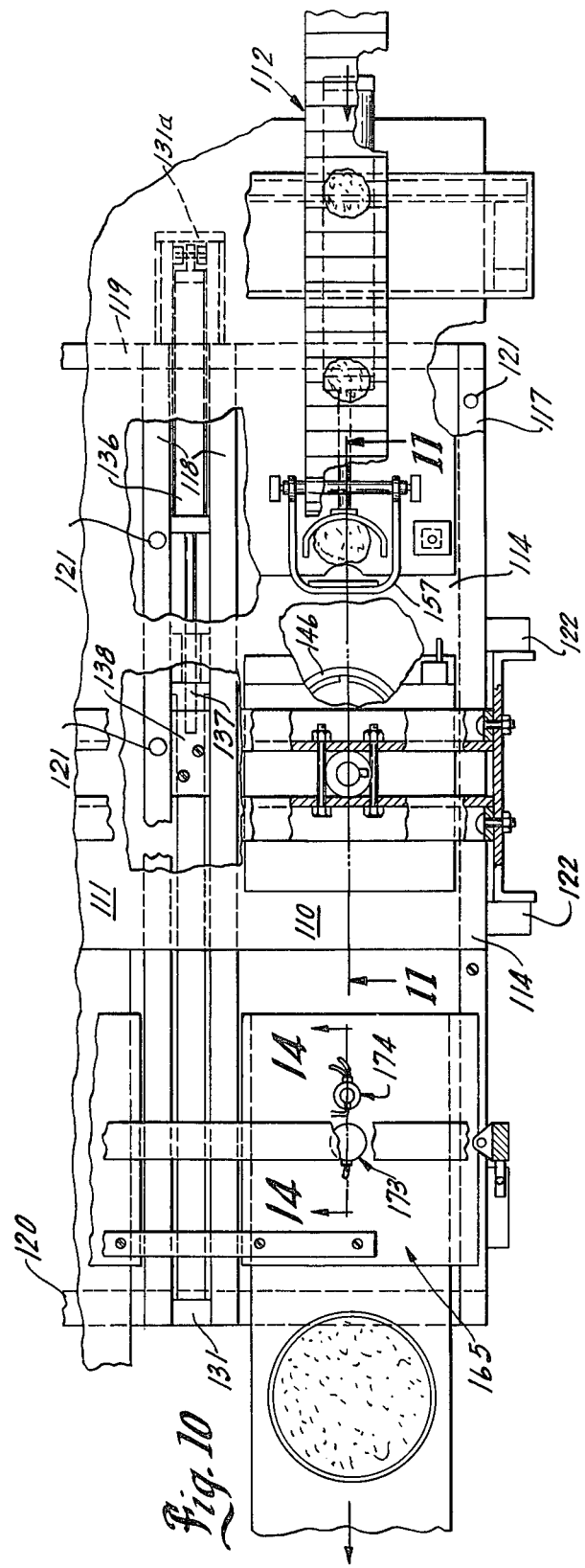
FIG. 10 is a fragmentary plan view of FIG. 9 with parts broken away and sectioned to show further structural detail.

An alternate embodiment of the invention is shown in FIGS. 9–14 having a first forming unit 110 and a second similar forming unit 111 partially shown in FIG. 10 and to indicate construction of side-by-side units. A ball feed and positioning means 112 would also be similarly constructed as side-by-side system. Consequently, the system associated with unit 110 is described in detail. Corresponding elements of the second system may be referred to by correspondingly primed numbers.

Referring to unit 110 a heating unit 115 is secured to the underside of conveyor plate 114. The heating unit 115 is a generally rectangular member having planar top and bottom walls. A conveyor plate 114 has a lower die 116 and is vertically movable into intimate contact with the planar heating surface during the forming of shell 2.

The plate 114 is a relatively thin, metal plate of stainless steel or the like which projects rearwardly and forwardly of the heating unit 115. The plate 114 also extends laterally across the complete width of the two forming die units 110 and 111 to define a common conveyor mounted on a rail or track means as follows. The opposite edges of the plate 114 are mounted for sliding, guided movement on similar side tracks 117 of the track means. Tracks 117 are supported to the opposite sides of the assembly adjacent to the vertical support channels. A pair of intermediate support tracks 118 (FIG. 10) support the intermediate position of the conveyor plate 114. The several tracks 117 are particularly constructed in accordance with one embodiment of the invention to define a floating support for the conveyor plate 114.

More particularly, the side tracks 117 and 118 are elongated, rectangular, bar-like members which are interconnected by supporting channesl 119 and 120 adjacent the front and rear cross-braces to provide vertical, guided movement of these tracks, as shown most clearly in FIGS. 11 and 12.

In this embodiment, bearing members 121 are secured within the tracks and protrude slightly above the upper surface of the tracks 117 to define a low friction support for the plate 114. The tracks 117 are supported to the front and back of the frame channels by the transverse track channels 119 and 120 which extend across the complete width of the apparatus. The track channels 119 and 120 may be welded or otherwise rigidly affixed to the underside of the tracks 117.

The transverse track channels 119 and 120 are similarly supported on a resilient spring support assembly and the assembly for the forward located channel 119 is described in detail with corresponding prime numbers applied to the opposite channel support assembly.

As shown in FIG. 11, a supporting cross-bar or brace 122 is secured at the opposite ends to the vertical channels by bolts which pass therethrough and thread into appropriate threaded portions or nuts secured to the vertical channel. The cross-bar 122 may include vertical slots permitting vertical adjustment of the location of the cross bars. The cross-bar 122 is vertically located by an adjustment bolt 125 which is threaded into a lug 125a secured to the flange of the vertical channels in alignment with the cross-bar 122. The vertical location of the bolt 125 within the lug positions of the supporting cross-bar. A plurality of coil springs 126 are located between bottom flange of the transverse track channel 119 and the cross-bar 122 to define a resilient spring support for the channel and interconnected tracks 117.

The front-to-back locating of the floating track assembly is adjusted or set by suitable adjustment bolt units 127 secured to track channels 119 and 120 and abutting the opposed walls defined by the cross-braces. Each unit 127 includes a lug member 127a welded or otherwise secured to the base of the channel 119. The adjustment bolt 127b passes through the channel 119 with a bearing pad 127c on the outer end engaging the cross-brace 127d between the vertical support channel 13.

By opposite positioning of the adjustments bolt units 127 in the respective channels 119 and 120, the assembly of tracks 117 is properly positioned with respect to the other cooperating components.

The tracks 117 project forwardly and rearwardly from the die assembly and particularly the vertical supports. As shown in FIG. 9, the opposite ends of the tracks are also spring supported and the forward support for the one outer track is shown and described. A fixed frame member 128 is provided adjacent to the feed unit end of the track and interconnecting the vertical channels. A suitable depending brace member 129 is secured to the underside of the track 117 and projects downwardly in alignment with the front bracket or frame member 128. A coil spring 130 is located therebetween to resiliently support the forward end of the track.

As shown in FIG. 10, the central tracks 118 are connected by a front member 131 while the aft ends of tracks 117 are connected by a member 131a having a central offset portion.

The tracks 117 thus form a first floating support for the conveyor plate 114 adjacent to heating unit 115 and die unit 116. The floating interconnected track assemblies create an integrated structure which is confined between the vertical channels 13 and above the heating units 115.

The plate 114 rests on the bearing pads 121 for guided sliding movement. The plate 114 is guided on the tracks by suitable front and rear guides 132 secured to the tracks 117 and mating front and rear guide blocks 133 secured to the plate, as most clearly shown in FIG. 11.

The plate 114 is positioned between the shell forming position, as shown in FIGS. 9-14 and a removal position as shown in phantom in FIG. 9. Referring to FIG. 10, hydraulic cylinder drive unit 136 between the center tracks 117 and pivotally mounted within understructure. A piston-rod 137 projects forwardly between tracks 117 and terminates at the outer end in a connection block 138 which is bolted to the underside of the plate 114. The block 138 has the opposite side edges recessed or grooved and mates with elongated track guides secured to the sidewalls of tracks 118 to further guide the movement of the conveyor plate 114.

A water cooled means, not shown, is preferably secured between tracks 118 with the piston-rod 137 passing therethrough for cooling of the connection to the plate 114 when aligned with the die units.

The total track structure thus provides a floating support permitting vertical movement of the conveyor plate 114 with respect to the heating units 115 for movement of the formed shells 2 from alignment with die unit 6.

With the conveyor plate 114 in the retracted position and the dough balls 4 properly located within the die unit 116, the shell 2 is formed by lowering the press as in the first embodiment.

In the embodiment of FIG. 9-14, the press unit includes a rigid, flat, planar plate 144 which moves into engagement with a replaceable forming die 146 of unit 116 which is releasably secured to the conveyor plate 114. Die 146 is formed with a peripheral upstanding or vertical lip 147 to define a forming cavity corresponding to a pizza shell 2 of a predetermined diameter. The desired shape and size will vary and, consequently, the die 146 is replaceable.

The dough ball 4 is positively and accurately positioned within the die units 6 and 6 through the positioning mechanism or units 112 which is also uniquely constructed similar to the first embodiment to positively locate the ball as shown in FIGS. 11 and 13. The transfer units provide for the proper timed movement of the dough balls 4 into alignment with the die unit 116. A supporting plate 152 is slidably disposed on the upper surface of the conveyor plate 114. Plate 152 is wider than die 146 and is raised above plate 114 by small bearing pads 153 spaced to the opposite sides of die. Plate 152 is, therefore, adapted to slide over the die 146. A power cylinder unit 154 is actuated in timed relation to the actuation of the associated die unit 116 and the movement of the conveyor plate 114 to move plate 152 and the dough ball 4 into the forming position simultaneously with the rearward movement of the conveyor plate 114 from the shell removal position.

In particular, the dough ball 4 is fed into and dropped onto the special support plate 152 which is mounted, in the retracted position, immediately beneath the discharge end of the dough ball conveyor 112. A generally U-shaped, vertical wall 155 is located on the plate 152 immediately beneath the terminal end of the dough ball conveyor 3 such that the dough ball 4 falls onto the plate 152 within the confines of the U-shaped wall 155. A positioning cylinder unit 156 is secured to plate 152 to the backside of the vertical wall 155 and has its piston rod secured to wall 155. When actuated, the vertical wall 155 is moved forwardly and moves ball 4 into overlying relation within the die. The retraction of the plate 152 and wall 155 leaves the ball 4 in position on the die 146. A holding unit on plate 152 selectively holds the ball 4 in position thereon until plate 152 has moved forwardly to properly locate the ball 4 within the die 146. This prevents the ball 4 from continuing to roll forwardly under its own inertia force as a result of the rapid forward movement of the positioning plate 152 between the die units and the like. A generally U-shaped arm 157 is shown pivotally mounted in overlying encircling relationship to the positioning wall 155 and the support area of the positioning plate 152. The ball 4 may thus move freely downwardly through the arm 157 onto the positioning plate 152. The ends of the U-shaped arm 157 are secured within a pivot shaft 158 in any suitable manner. The pivot shaft 158, in turn, is pivotally supported at the opposite ends on upstanding vertical brackets 159 secured to the positioning plate 152 immediately behind and to the opposite sides of the positioning wall 155 and coupled to an air cylinder unit 161 mounted on plate 152.

The movement of plate 114 aligns the formed shell with a removal unit 165 may be generally similar to those disclosed in U.S. Pat. No. 3,949,660. In the present embodiment, unit 165 is mounted in a relatively fixed relation with respect to the die unit 116 in an overlying relationship to the oven conveyor 166. The removal unit 165 is a generally plate-like unit having an inner chamber 167 with a bottom wall 168. Large apertures 169 are provided in wall 168 essentially arranged to correspond to that of the partially cooked pizza shell 2. The apertures 169 are covered with suitable screen-like elements 169a within the chamber 167. The inner location of the screens minimizes the movement of the shell dough intol filling engagement with the screen while establishing an effective pick-up force. The pins 170 are specially formed as blunted members having flat outer ends 171 with four similarly curved sidewalls 172. The pins 170 may be formed from cylindrical pins embedded in plate 168 and with four sidewalls formed by removal of extended portions.

The removal unit 165 is raised and lowered by a pneumatic cylinder unit 173.

Air and vacuum are supplied to the pick-up plate chamber 167 in the illustrated embodiment of the invention by a separate air operated pilot valve unit 174 secured to the top wall of the unit. Unit 174 is located immediately forwardly of the hydraulic positioning cylinder unit 173 which is secured to the upper crossbar of a U-shaped mounting bracket or frame 175. Cylinder unit 173 is operated for selectively moving of the plate 168 downwardly to piercing and pick-up relationship to the formed shell 2 and to the raised position for removing the shell 2 from the conveyor plate 114 which then is withdrawn. The shell 2 is then dropped from the pick-up plate by the suitable application of a positive pressure within the pick-up plate chamber 168.

A suitable pilot operated valve unit 174 is shown in FIG. 14. Generally, the valve unit 174 includes a dual chamber valve body 180 secured to the upper wall of the unit 165 and connected to chamber 167 by an outlet port 181. The valve unit 174 includes an intermediate wall defining an upper vacuum supply chamber 182 and a bottom at a lower or bottom air supply chamber 183. The vacuum chamber 182 is coupled by a suitable input to a suitable vacuum source which preferably includes a relatively large vacuum tank 184 to act as a cushion to minimize variations in the vacuum level. The air chamber 183 is connected by an input port to a suitable source of pressurized air.

The intermediate wall is provided with an opening 185 for transmitting the vacuum pressures through the air chamber directly to the pick-up plate. The opening 185 is provided with a valve seat on the underside, with a valve member 186 selectively positioned in spaced relation thereto and in engagement therewith by a pneumatic pilot valve 187 which is secured to the upper wall of the valve body 180. In the illustrated embodiment of the invention, the pilot valve 187 is a piston cylinder unit including a cylinder 188 mounted in sealed relationship to the upper wall of the valve body. A spring-loaded piston 189 is mounted therein and includes a piston rod 190 extending downwardly through the valve body and particularly the valve opening and attached to the valve member 186 at its innermost end. When an air signal is applied to the underside of the piston 189, it moves upwardly driving the valve member upwardly in sealing engagement with the valve seat. In operation of the system, the vacuum signal is maintained on the vacuum port and within the back pick-up plate unit 165 which is moved downwardly into pick-up relationship with the shell. To drop the raised shell 2, air signals are simultaneously supplied to the pilot valve 187 and to the valve air chamber 183. The pilot valve 187 promptly closes, thereby cutting off the vacuum connection to prevent by-passing of the applied air to the vacuum source. The air pressure instantaneously builds up within the pick-up plate chamber 167 and positively forces the dough shell 2 downwardly from the interconnecting piercing pin 170.

This provides a means of selectively picking up and dropping of the shells in rapid timed relationship to the movement of the transfer plate 114 to thereby minimize the time required in the cyclical operation of the dough forming apparatus.

The second embodiment may employ any suitable, electrical circuit which preferably includes an interlocking system for reliably maintaining interaction between the several components, as shown for the first embodiment.

As shown and described for the second embodiment, side-by-side die forming units may be employed to permit the multiple forming and transfer of a plurality of the shells 2. Obviously any number of the units can be provided in side-by-side relation. Generally, individual forming units require the spacing of the shells from each other to accommodate the necessary supporting structures and the like. In order to provide for maximum production, rows of a plurality of forming units may be mounted in staggered relation as diagrammatically illustrated in FIG. 15.

Figure 15:
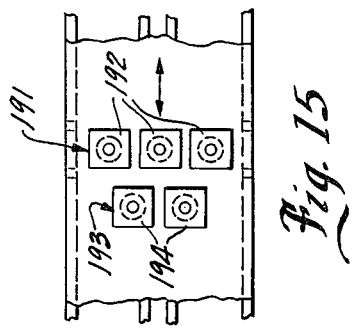
FIG. 15 is a diagrammatic illustration of a portion of the shell forming unit employing a multiple staggered array of individual forming units.

Referring particularly to FIG. 15, a first row 191 of three forming units 192 are diagrammatically illustrated with a second similar row 193 of two units 194 located in front of row 191. The units of row 193 are staggered or offset with respect to the corresponding units of the first row 191 to locate the shells 2 in close lateral spacing across the conveyor plate 114. A corresponding plurality of and similarly arranged removal units would be provided downstream to receive the total set of formed shells. The close spacing of the shells permits use of a relatively narrow oven, with the advantage of increasing the usage and significantly reducing the cost.

The various particular elements and connections may be varied as desired.

The present invention provides a highly improved high speed in-line forming apparatus particularly adapted to the forming of food crust elements such as pizza shells, pie crusts, and the like.

Various modes of carrying out the invention are contemplated as being within the scope of the following claims particularly pointing out and distinctly claiming the subject matter which is regarded as the invention.

I claim:

1. A forming apparatus for sequential forming of an element from raw material, comprising a support means, a movable forming means mounted in alignment with said support means and movable into engagement with said support means for forming said element, a transfer means mounted in spaced relation to said support means and including a movable forward wall means having a lowered confining position for confining of the raw material and vertically movable to a release position above the confining position, and a power means for moving said transfer means longitudinally between said die means and said support means with said forward wall means in the confining position and for raising said forward wall means for removing of the transfer means from said forming means.

2. The apparatus of claim 1 wherein said transfer means includes a support plate and reciprocates longitudinally, and a reciprocating raw material positioning means movable to force the raw material from the plate onto the support means upon alignment of the material with the forming means.

3. The apparatus of claim 1 wherein said transfer means includes means for moving a formed element from the forming means as the transfer means moves a new raw material into the forming means.

4. The apparatus of claim 1 wherein said transfer means includes a raw material support, guide means for moving said support over the support means, power means connected to reciprocate said support between a raw material load position and a raw material discharge position aligned with the movable forming means, means to supply raw material to the support in the load position and a removal means to remove the raw material from the support.

5. The apparatus of claim 4 wherein the removal means includes a pusher slidably mounted to the support, power means secured to the support and operable to push the pusher forwardly and move the raw material.

6. The apparatus of claim 4 having a forward transfer unit coupled to said support and moving into engagement with a formed element to move it forwardly, said forward transfer unit including a confining stop defining said forward wall means spaced forwardly of the support and limiting the movement of the raw material being removed from the support, and release means for moving the forward transfer unit and the stop upwardly above the raw material removed from the support.

7. The apparatus of claim 1 wherein said raw material is supplied as a greased food ball and said forming means presses said ball into a shell and said support means is a flat bed, said transfer means includes a raw material support plate, guide means for moving said support plate over the bed, power means connected to reciprocate said support plate between a ball load position and a ball discharge position aligned with the movable forming means, means to supply one of said food balls to the support plate in the load position, a pusher wall slidably mounted to the support plate, power means secured to the support plate and operable to push the pusher wall forwardly and move the ball off the support plate, a forward transfer unit coupled to said support plate and moving into engagement with a formed shell to move it forwardly, said forward transfer unit including a confining stop wall defining said forward wall means spaced forwardly of the support plate and limiting the movement of the ball being pushed from the support plate, and release means for moving the forward transfer unit and the stop wall upwardly above the ball pushed from the support plate.

8. The apparatus of claim 7 wherein said transfer unit includes a rearwardly projecting pivot arm means, pivotal support means secured to the support plate and pivotally supporting of said arm means, and power means on said support plate and coupled to said arm means to pivot the arm means and raise the stop wall.

9. The apparatus of claim 7 including a conveyor means located to receive a formed shell, said transfer means placing the formed shell at least partially onto said conveyor means for removal of the formed shell from the transfer unit.

10. The forming apparatus of claim 1 wherein a die means is secured to said support means, said transfer means includes a support plate located above the die means on said support means, said power means moving said support plate over the die means, and means to move the raw material from the support plate onto the die means.

11. A forming apparatus for producing a partially baked food element from a bulk material, comprising a support plate means having an opening, a heating means secured within said opening and having an upper die surface, a transfer means mounted in overlying spaced relation to said support means and including a raw material support having a forward confining stop wall having a confining position for the raw material and mounted for limited vertical movement to a release position above the confining position and a back confining wall and movable outwardly to move the raw material toward the forward confining stop wall and off the support onto the heating means, a movable forming die means mounted in overlying relation to said heating means and movable into engagement with said heating means for pressing said material, and means for moving said transfer means longitudinally between said die means and said heating means with said die means spaced from said heating means, and then moving the raw material onto the heating means and thereafter raising the confining wall and retracting the transfer means.

12. The apparatus of claim 11 wherein said transfer means includes a front plate means slidably engaging the support means and moving under the formed element and having a stop wall engaging the formed element and moving the formed element from the heating means.

13. The apparatus of claim 11 including a conveyor means located to receive a formed element, said transfer means placing the formed element at least partially onto said conveyor means for removal of the formed element from the transfer unit.

14. The apparatus of claim 11 including first and second limit switch means for detecting the load and discharge positions of the transfer means, third and fourth limit switch means for detecting the raised and lowered positions of the forming die means, a fifth limit switch means to detect the raising of the stop wall, and circuit means connected to said limit switches and including control means for said transfer means and said die means to sequentially and automatically cycle the operation of the transfer means and the forming die means.

15. The apparatus of claim 11 wherein the heating means includes a plurality of individual elongated elements mounted in an enclosure including said die surface, an input connection means secured to the enclosure, and cooling means coupled to the enclosure adjacent the connection means.

16. The apparatus of claim 15 including a power motor means coupled to the forming die means, and wherein the die means includes a plurality of individual elongated heating elements embedded within an enclosure, a power connection means in one end of the enclosure to said elements, and cooling means for cooling the enclosure to protect the power connection and the power positioning connection.

17. The apparatus of claim 11 wherein the die means includes a second heating means, and means to energize the first and second heating means to a temperature at least of the order 325° F., and means to hold the forming means against the support with a pressure of above 1,000 pounds per square inch.

18. The apparatus of claim 11 including means to momentarily release said holding pressure immediately prior to raising of the forming die means.

19. The apparatus of claim 11 wherein said transfer means includes a raw material support plate, guide means for moving said support plate over the support means, power means connected to reciprocate said support plate between a raw material load position and a raw material discharge position aligned with the movable die means, means to supply raw material to the support plate in the load position, a pusher wall slidably mounted to the support plate, power means secured to the support plate and operable to push the pusher wall forwardly and move the raw material off the support plate, a forward transfer unit coupled to said support plate and moving into engagement with a formed element to move it forwardly, said forward transfer unit including said confining stop wall spaced forwardly of the support plate and limiting the movement of the raw material being pushed from the support plate, and release means for moving the forward transfer unit and the stop wall upwardly above the raw material pushed from the support plate.

20. The apparatus of claim 19 wherein said transfer unit includes a rearwardly projecting pivot arm means, pivotal support means secured to the support plate and pivotally supporting of said arm means, and power means on said support plate and coupled to said arm means to pivot the arm means and raise the stop wall.

21. The apparatus of claim 19 including a conveyor means located to receive a formed element, said transfer means placing the formed element at least partially onto said conveyor means for removal of the formed element from the transfer unit.

22. The apparatus of claim 21 including a piercing means secured over said conveyor means and including a rotating tined wheel having plurality of tines moving into the upper surface of the element, and a hold-down means located between the tines to hold the element on the conveyor means.

23. The apparatus of claim 22 wherein each of the tines includes a chisel end having a flat outermost face.

24. The apparatus of claim 21 including first and second limit switch means for detecting the load and discharge position of the transfer means, third and fourth limit switch means for detecting the raised and lowered positions of the forming die means, a fifth limit switch means to detect the raising of the stop wall, and circuit means connected to said limit switches and including control means for said transfer means and said die means to sequentially and automatically cycle the operation of the transfer means and the forming die means.

25. The apparatus of claim 24 including timer means for energizing said heating means for a predetermined period and retracting of the forming die means, control means for moving the die means down and control means for moving the die means up, and a second timer means to sequentially retract the forming die means by first releasing the downward moving means and then activating a retracting moving means.

26. The apparatus of claim 25 wherein the heating means includes a plurality of individual elongated elements mounted in an enclosure including said die surface, an input connection means secured to the enclosure, and cooling means circulated through the enclosure adjacent the connection means.

27. The apparatus of claim 25 wherein the die means includes a heating means, and including means to heat the heating means and the die means to a temperature at least of the order of 325° F., and means to hold the forming means against the support with a pressure of above 1,000 pounds per square inch.

28. The apparatus of claim 11 including first and second limit switch means for detecting the load and discharge position of the transfer means, third and fourth limit switch means for detecting the raised and and lowered positions of the forming die means, a fifth limit switch means to detect the raising of the stop wall, and circuit means connected to said limit switches and including control means for said transfer means and said die means to sequentially and automatically cycle the operation of the transfer means and the forming die means.

29. The apparatus of claim 28 including timer means for energizing said heating means for a predetermined period and retracting of the forming die means.

30. The apparatus of claim 27 having control means for moving the die means down and control means for moving the die means up, and including a timing means to sequentially retract the forming die means by first releasing the downward moving means and then activating a retracting moving means.

31. A forming apparatus, comprising a support means, a conveyor plate means mounted in spaced relation to said support means and having limited vertical movement with respect thereto, a movable die means mounted in alignment with said support means to the opposite side of the conveyor plate means and movable into engagement with said conveyor plate means and operable to move the conveyor plate means downwardly to firm engagement with said support means, and a means for moving said conveyor plate means longitudinally between said die means and said support means with said die and support means spaced from said conveyor plate means.

32. The apparatus of claim 31 wherein said conveyor plate means reciprocates longitudinally and a reciprocating bulk material positioning means which moves between the die means and conveyor plate means during retracting of the conveyor plate means.

33. The apparatus of claim 31 wherein a shaping die is secured to the plate means and includes an upwardly opening shaping cavity.

34. The apparatus of claim 31 including a bulk material positioning means having means slidably mounting the positioning means over the plate means and having a support plate with horizontal confining means to contain the material during sliding movement of the positioning means.

35. The apparatus of claim 31 including a removal means located forwardly of the die means and in forwardly spaced alignment, means to move the conveyor means to align the food product with the removal means, said removal means being located above the plane of the formed food product and movable into pick-up engagement therewith.

36. The apparatus of claim 35 wherein said removal means includes a plurality of blunted projections moving into the upper surface of the shell.

37. The apparatus of claim 31 wherein said conveyor plate means includes a track means and a reciprocating plate element slidably disposed on said track means for movement between said die means and support means, track support means connected to said track means and to said support means, and said track support means including resilient means between said support means and said track means continuously urging said track means toward said die means to thereby space the conveyor plate element from the support means.

38. The apparatus of claim 37 wherein said support means includes a horizontal frame member, a heating unit, means connected to said frame member and said heating unit and fixedly mounting said heating unit on said frame member beneath said plate element, said heating unit having a generally planar top wall parallel to the bottom of said conveyor plate element overlying said heating unit, and said resilient means supporting said plate element above the level of the top plane of the heating unit means and permitting the track means to move vertically with the plate element moving into firm heat transfer relationship to said heating unit.

39. The forming apparatus of claim 38 wherein said track means includes a first track element located adjacent one side of said heating unit, a second track element located adjacent to the opposite side of said heating unit, means interconnecting said elements, and guide means secured to said track elements and said plate to slidably couple the plate to the track means.

40. The apparatus of claim 31 having a pair of vertical support members, a cross-beam unit connected to said support members and having vertical and planar sidewalls, heating means mounted on said cross-beam unit and having a flat top wall, said conveyor means including tracks located to the opposite sides of the heating means and a flat plate member slidably disposed on said tracks, sliding coupling means secured to the underside of the plate and to the sides of the tracks, cross-beam members secured to the underside of said tracks to the opposite sides of said cross-beam unit, adjustable loading means secured to the cross-beam members and slidably bearing on said sidewalls to locate the tracks relative to the cross-beam unit, cross-bars adjustably attached to the vertical support members beneath the cross-beam members, a plurality of coil springs located between the cross-bars and the cross-beam members, said support means including coil spring support means aligned with the outer ends of the tracks.

41. The apparatus of claim 31 wherein said conveyor means includes a reciprocating plate element, a lower die means secured to the plate element and having an upwardly opening material receiving cavity, a track means secured to said support means and slidably supporting said plate element for movement between said die means and said support means, and resilient means supporting said track means and continuously urging said track means and plate element toward said upper die means to thereby space the conveyor plate element from the heating means.

42. The food forming apparatus of claim 41 including a removal means located in downstream relation to said die means and having a pick-up unit located in a plane immediately above the uppermost plane of said lower die means, supply means for supply of bulk units to the conveyor plate element to the opposite side from the removal means, a positioning means for moving of the bulk units across the conveyor plate element and said die means, said removal means includes a plate-like enclosure having an apertured bottom wall including a plurality of apertures generally in an array corresponding to the formed food product, means to selectively apply a vacuum to said apertures for lifting of a formed product.

43. The apparatus of claim 42 having piercing means secured to said bottom wall to pierce the shell as it moves therefrom.

* * * * *

UNITED STATES PATENT AND TRADEMARK OFFICE
CERTIFICATE OF CORRECTION

PATENT NO. : 4,116,119

DATED : September 26, 1978

INVENTOR(S) : Kuhlman

It is certified that error appears in the above—identified patent and that said Letters Patent are hereby corrected as shown below:

| | | | |
|---|---|---|---|
| Column 2, | Line 26, | After "rotating" should "timed" read "tined"?; |
| Column 2, | Line 27, | After "then" cancel "transfering" and insert --- transferring ---; |
| Column 5, | Line 4, | After "connections" cancel "including" and insert --- include ---; |
| Column 6, | Line 34, | After "posts 65" cancel "aecured" and insert --- secured ---; |
| Column 7, | Line 27, | After "and" cancel "prvnt" and insert --- prevent ---; |
| Column 7, | Line 42, | After "repetitively" cancel "actuage" and insert --- actuate ---; |
| Column 9, | Line 20, | After "for" insert --- actuating a solenoid 102 for ---; |

UNITED STATES PATENT AND TRADEMARK OFFICE
CERTIFICATE OF CORRECTION

PATENT NO. : 4,116,119

DATED : September 26, 1978

INVENTOR(S) : Kuhlman

It is certified that error appears in the above-identified patent and that said Letters Patent are hereby corrected as shown below:

| Column | 9, | Line | 21, | After "first" cancel "actuating a solenoid 102 for"; |
|---|---|---|---|---|
| Column | 10, | Line | 16, | After "supporting" cancel "channesl" and insert --- channels ---; |
| Column | 12, | Line | 53, | After "dough" cancel "intol" and insert --- into ---; |
| Column 17 CLAIM 22 | | Line | 11, | After "having" insert --- a ---; |
| Column 17 CLAIM 28 | | Line | 52, | After "raised" cancel "and". |

Signed and Sealed this

Seventeenth Day of April 1979

[SEAL]

Attest:

RUTH C. MASON
*Attesting Officer*

DONALD W. BANNER
*Commissioner of Patents and Trademarks*